United States Patent [19]

Nagashima et al.

[11] Patent Number: 5,701,436
[45] Date of Patent: Dec. 23, 1997

[54] INFORMATION PROCESSING APPARATUS INCLUDING SYNCHRONOUS STORAGE HAVING BACKUP REGISTERS FOR STORING THE LATEST SETS OF INFORMATION TO ENABLE STATE RESTORATION AFTER INTERRUPTION

[75] Inventors: Tetsuro Nagashima; Toshiharu Kawanishi; Shigeaki Okutani; Osamu Nomura; Takashi Iino, all of Kawasaki, Japan

[73] Assignee: Fujitsu Limited, Kawasaki, Japan

[21] Appl. No.: 508,685

[22] Filed: Jul. 28, 1995

[30] Foreign Application Priority Data

Jan. 31, 1995 [JP] Japan .............. HEI 7-013667

[51] Int. Cl.⁶ .................. G06F 11/20; G06F 12/00
[52] U.S. Cl. ............ 395/489; 395/182.04; 365/189.12; 371/31
[58] Field of Search .................. 395/488, 489, 395/182.03, 182.04, 182.13, 182.14, 182.15; 371/31; 365/189.12

[56] References Cited

U.S. PATENT DOCUMENTS

| | | | |
|---|---|---|---|
| 4,385,365 | 5/1983 | Hashimoto et al. | 395/569 |
| 4,625,312 | 11/1986 | Bashaw | 395/183.07 |
| 4,718,065 | 1/1988 | Boyle et al. | 371/22.2 |
| 4,901,228 | 2/1990 | Kodama | 395/182.03 |
| 4,996,687 | 2/1991 | Hess et al. | 395/182.13 |
| 5,255,381 | 10/1993 | Chinnaswamy et al. | 395/488 |
| 5,327,566 | 7/1994 | Forsyth | 395/775 |
| 5,339,321 | 8/1994 | Paek | 371/31 |
| 5,390,149 | 2/1995 | Vogley et al. | 365/189.01 |
| 5,450,455 | 9/1995 | Hamilton et al. | 375/213 |
| 5,619,642 | 4/1997 | Nielson et al. | 395/182.04 |
| 5,625,594 | 4/1997 | Choi et al. | 365/189.12 |

FOREIGN PATENT DOCUMENTS

| | | |
|---|---|---|
| 57-106968 | 7/1982 | Japan . |
| 60-229141 | 11/1985 | Japan . |
| 61-131125 | 6/1986 | Japan . |
| 62-262146 | 11/1987 | Japan . |
| 63-282533 | 11/1988 | Japan . |
| 2-120938 | 5/1990 | Japan . |
| 2-139663 | 5/1990 | Japan . |
| 5-61748 | 3/1993 | Japan . |
| 5-165663 | 7/1993 | Japan . |

*Primary Examiner*—Tod R. Swann
*Assistant Examiner*—Keith W. Saunders
*Attorney, Agent, or Firm*—Armstrong, Westerman, Hattori, McLeland & Naughton

[57] ABSTRACT

Herein disclosed is an information processing apparatus having a synchronous storage and the synchronous storage which can resume an operation continuing from before an interruption without hindrance even after a series of read/write operations have been interrupted and a read/write of internal condition values has been performed in a scanning operation or the like. The information processing apparatus successively selects information stored in address backup registers in two stages and data backup registers in two stages and outputs the selected information to the synchronous storage when a normal operation is resumed, thereby restoring an address data register, a data input register and a data output register to the same conditions as before the interruption of the normal operation. This invention is applicable to a synchronous storage accessible in synchronism with a system clock and an information processing apparatus having such synchronous storage.

4 Claims, 10 Drawing Sheets

PRIOR ART

FIG. 11

PRIOR ART

FIG. 12

PRIOR ART

FIG. 13

PRIOR ART

INFORMATION PROCESSING APPARATUS INCLUDING SYNCHRONOUS STORAGE HAVING BACKUP REGISTERS FOR STORING THE LATEST SETS OF INFORMATION TO ENABLE STATE RESTORATION AFTER INTERRUPTION

BACKGROUND OF THE INVENTION

1) Field of the Invention

The present invention relates to a synchronous storage which is accessed in synchronism with a system clock and an information processing apparatus having such synchronous storage.

Recently, there has been a demand toward further speedup of a processing rate of an information processing apparatus such as a computer system. There has been also a demand for a quicker access to the storage used on the periphery of the processing apparatus.

There has been developed a synchronous storage enabling a quick storage access, which has, instead of a storage configuration known in the art, registers provided on both sides of reading and writing of a storage body or only a side of writing operable in synchronism with a system clock on one memory chip, in which an access is got to the storage body in synchronism with the system clock.

2) Description of the Related Art

Figure 8:
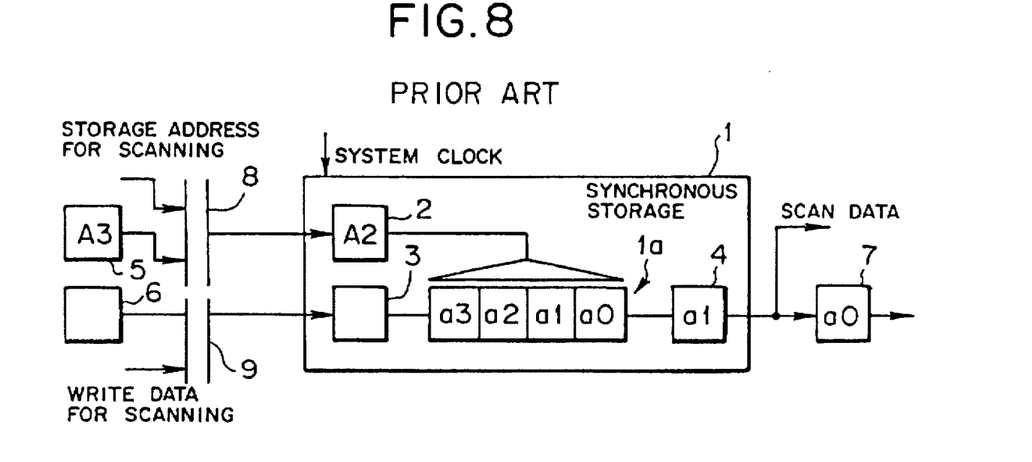
FIG. 8 is a block diagram showing a structure of a general synchronous storage.

FIG. 8 shows a typical structure of such synchronous storage. In FIG. 8, reference numeral 1 denotes a synchronous storage. The synchronous storage 1 has a storage body 1a, an address data register (ADR) 2, a data input register 3 and a data output register 4, and is formed on a memory chip.

The storage body 1a is a general storage heretofore used. In the storage body 1a shown in FIG. 8, data a0 through a3 specified by addresses A0 through A3, respectively, are stored.

The address data register 2 receives a specified address by which a read access or a write access should be had to the storage body 1a from the outside, and retains it according to a system clock (or a scan clock described later).

The data input register 3 is disposed on the side of writing of the storage body 1a. When a write access is had to the storage body 1a, the data input register 3 retains write data fed from the outside according to the system clock (or the scan clock). The write data retained in the data input register 3 is written into the address retained in the address data register 2 of the storage body 1a.

The data output register 4 is disposed on the side of reading of the storage body 1a. When a read access is got to the storage body 1a, the data output register 4 retains data at the address retained in the address data register 2 as read data according to the system clock (or the scan clock).

In the example shown in FIG. 8, the synchronous storage 1 mentioned above is used in an information processing apparatus such as a computer system having a scan circuit (not shown) which can read and write internal condition values (values of the registers 2 through 4) of the synchronous storage 1 in addition to a main circuit (now shown) operating during the operation.

Such system has an address data register (ADR) 5 for retaining a specified address given to the synchronous storage 1 according to the system clock, a write data register (WDR) 6 for retaining write data that should be written in the synchronous storage 1 according to the system clock, and a read data register (RDR) 7 for retaining read data fed from the synchronous storage 1 according to the system clock during the normal operation, as shown in FIG. 8. The system further includes a multiplexer 8 for performing a switching operation to give a memory address for scanning to the synchronous storage 1 instead of the specified address from the address register 5, and a multiplexer 9 for performing a switching operation to give write data for scanning to the synchronous storage 1 instead of write data from the write data register 6 during the scanning operation by the above scanning circuit.

With the above structure, the multiplexers 8 and 9 are switched to sides of the registers 5 and 6, respectively, during the normal operation. The address and the write data stored in the respective address data register 5 and the write data register 6 are transferred to the address data register 2 and the data input register 3 of the synchronous storage 1, respectively, in synchronism with the system clock.

If a chip select signal (CS; not shown) and a write enable signal (WE; not shown) for the synchronous storage 1 are both ON, the data in the data input register 3 is written into the address of the address data register 2 in the storage body 1a. In practice, registers for retaining the chip select signal and the write enable signal are also provided in the synchronous storage 1.

If the chip select signal for the synchronous storage 1 is ON and the write enable signal for the synchronous storage 1 is OFF, the data in the storage body 1a at the address specified by the address data register 2 is retained in the output register 4 in synchronism with the system clock, then transferred to the read data register 7 from the output register 4 in synchronism with the next system clock.

For instance, when a read access is got to the synchronous storage 1, addresses A3 and A2 are retained in the address data registers 5 and 2, respectively, and data a1 and a0 are retained in the data output register 4 and the read data register 7, respectively, as shown in FIG. 8.

Figure 9:
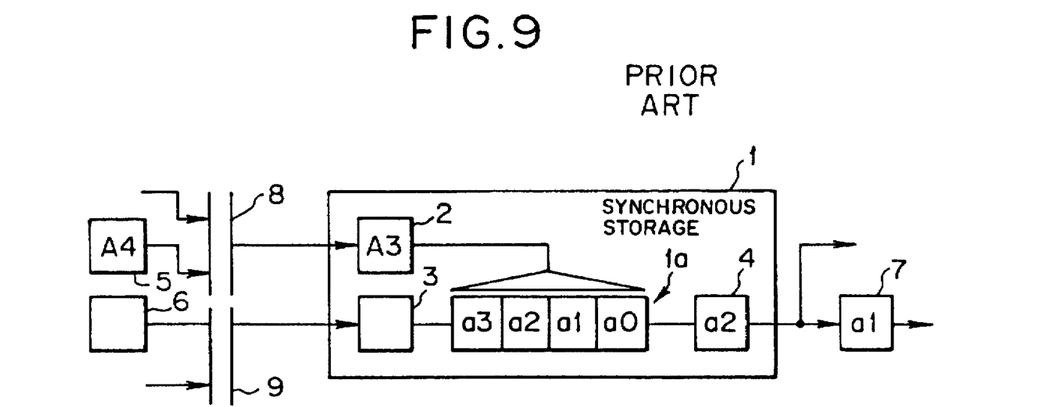
FIGS. 9 through 13 are block diagrams for illustrating an operation of the general synchronous storage.

When the next system clock rises under the above condition, the next specified address A4 is stored in the address data register 5, and the address A3 of the address data register 5 is transferred to the address data register 2, as shown in FIG. 9. At the same time, the data a2 of the data output register 4 is transferred to the read data register 7, and the data a2 at the address A2 having been retained in the address data register 2 the last time (FIG. 8) is read out from the storage body 1a and stored in the data output register 4. Incidentally, a write access is performed by transferring the write data in the write data register 6 to the data input register 3 according to the system clock in the similar manner to the above.

Figure 10:
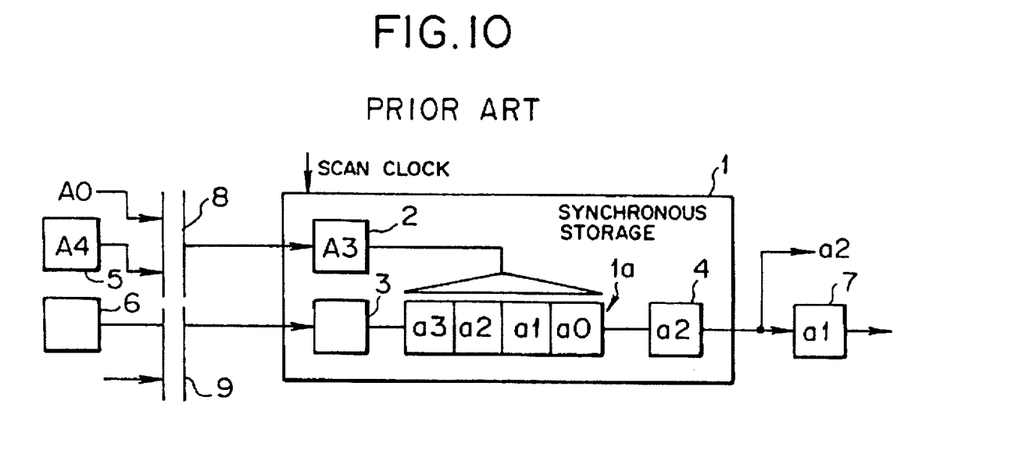

When a scan read operation is initiated from the above condition shown in FIG. 9, the multiplexer 8 is switched to a side of the memory address for scanning, and the scan clock is send, instead of the system clock, to the synchronous storage 1, as shown in FIG. 10. This scan clock is not provided to the registers 5 through 7.

Figure 11:
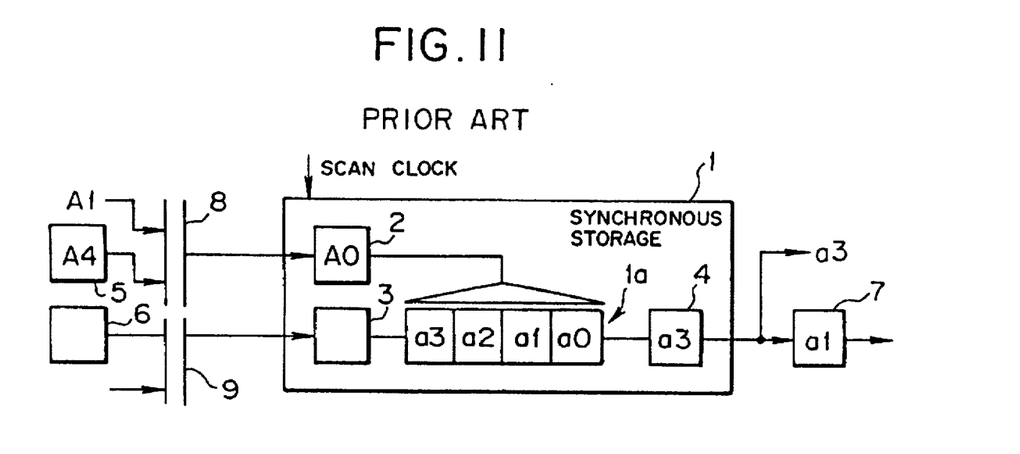

When the scan clock rises, the memory address A0 for scanning is transferred to the address data register 2, the data a3 at the address A3 having been retained in the input register 4 the last time (FIG. 10) is read out from the storage body 1a and stored in the data output register 4, and the data a3 is outputted as scan data from the synchronous storage 1 as shown in FIG. 11.

Incidentally, a scan write operation is performed by switching the multiplexer 8 to the side of the memory address for scanning, switching the multiplexer 9 to the side of the write data for scanning, and providing the scan clock, instead of the system clock, to the synchronous storage 1 in the similar manner to the above scan read operation.

Figure 12:
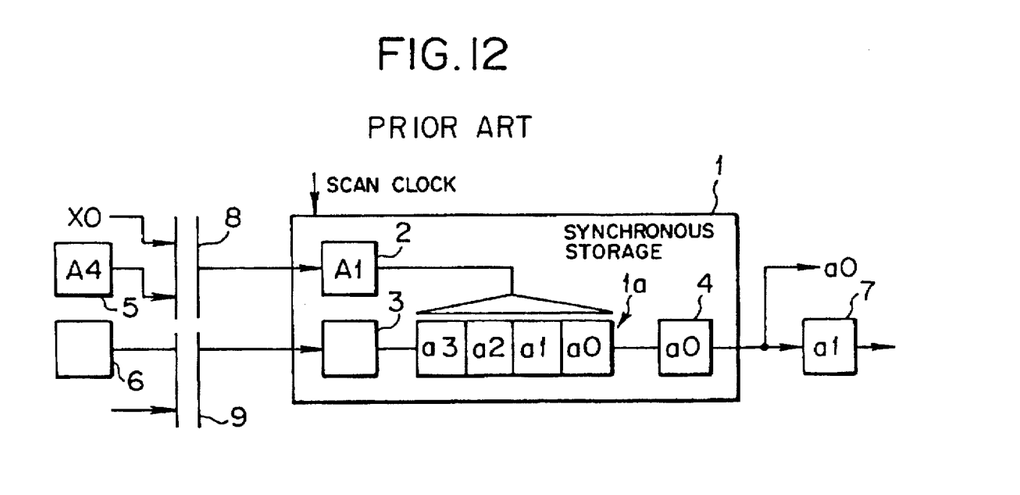
Figure 13:
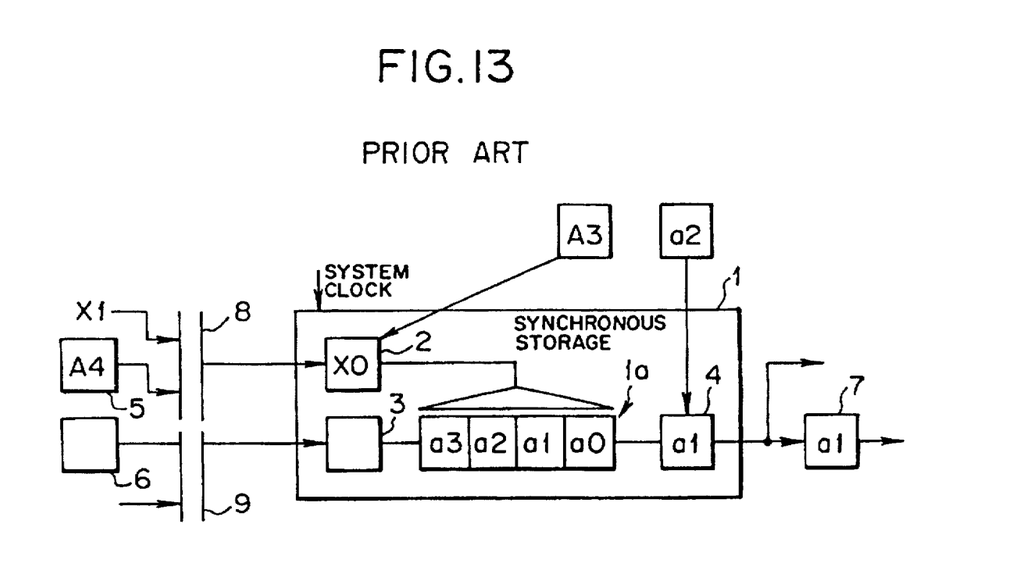

When the operation returns to the normal operation after the scan read operation similar to the above, the multiplexers 8 and 9 are switched to the registers 5 and 6, respectively, the scan clock is stopped and supply of the system clock to the synchronous storage 1 is resumed, as shown in FIGS. 12 and 13.

If continuous data from the main circuit (not shown) is simply processed using the synchronous storage 1, an apparatus employing the above synchronous storage 1 has no problem so long as the read/write operation is continuously performed on the synchronous storage 1 according to the system clock.

However, if the continuous read/write operation is interrupted and an internal value of the synchronous storage 1 is read in the scanning operation having been described with reference to FIGS. 10 through 13, or the internal value of the synchronous storage 1 is arbitrarily rewritten, condition values of the internal registers 2 through 4 provided in the synchronous storage 1 at the time of the interruption of the read/write operation (at the time of FIGS. 9 and 10) differ from those when the normal operation is resumed (at the time of FIG. 13) because of the operation (the scan operation) after the interruption as above.

For example, the address A3 is retained in the address data register 2 and the data a2 is retained in the output register 4 at the time of the interruption shown in FIGS. 9 and 10. At the time of the resumption shown in FIG. 13, the address X0 is retained in the address data register 2 and the data a1 is retained in the data output register 4. In order to accurately proceed a continuous operation after the resumption of the normal operation, a restoring operation to store the address A3 in the address data register 2 and store the data a2 in the data output register 4 is necessary.

However, once the main circuit is operated, no arbitrary access can be obtained from to the synchronous storage 1 until the operation is completed in the information processing apparatus or the synchronous storage 1 known in the art, and therefore the restoration as above is impossible. If the former continuous operation (an operation continuing from the condition shown in FIG. 9) is executed from the condition shown in FIG. 13, an unexpected value is outputted from the synchronous storage 1. It is thus impossible to perform a data processing continuing from before the interruption of the normal operation. If a continuous data processing is required by all means, there is nothing for it but to start again the continuous data processing from the beginning.

SUMMARY OF THE INVENTION

In the light of the above problem, the present invention provides an information processing apparatus having a synchronous storage and a synchronous storage which can resume an operation continuing from before an interruption even after a series of read/write operations have been interrupted and a read/write of internal condition values has been performed in a scanning operation or the like, for the purpose of improvement of the operability.

The present invention therefore provides an information processing apparatus having a synchronous storage having an address data register, a data input register and a data output register operating in synchronism with a system clock, comprising address backup registers in two stages for storing at all times the latest two among address information having been transferred to said address data register in synchronism with the system clock during a normal operation, data backup registers in two stages for storing at all times the latest two among write data information having been transferred to said data input register in synchronism with the system clock during the normal operation, and a switching means for successively selecting information stored in said address backup registers in two stages and said data backup registers in two stages to output the selected information to said address data register and said data input register in said synchronous storage when the normal operation is resumed after the normal operation has been interrupted and an access has been had to said synchronous storage with a clock different from the system clock, thereby restoring said address data register, said data input register and said data output register in said synchronous storage to the same conditions as before the interruption of the normal operation.

The present invention also provides an information processing apparatus having a synchronous storage having an address data register and a data input register operating in synchronism with a system clock, comprising an address backup register for storing at all times the latest one among address information having been transferred to said address data register in synchronism with the system clock during a normal operation, a data backup register for storing at all times the latest one among write data information having been transferred to said data input register in synchronism with the system clock during the normal operation, and a switching means for outputting information stored in said address backup register and said data backup register to said address data register and said data input register in said synchronous storage when the normal operation is resumed after the normal operation has been interrupted and an access has been had to said synchronous storage with a clock different from the system clock, thereby restoring said address data register and said data input register in said synchronous storage to the same conditions as before the interruption of the normal operation.

The present invention also provides a synchronous storage having an address data register, a data input register and a data output register operating in synchronism with a system clock comprising address backup registers in two stages for storing at all times the latest two among address information having been transferred to said address data register in synchronism with the system clock during a normal operation, data backup registers in two stages for storing at all times the latest two among write data information having been transferred to said data input register in synchronism with the system clock during the normal operation, a switching means for successively selecting information stored in said address backup registers in two stages and said data backup registers in two stages to output the selected information to said address data register and said data input register in said synchronous storage when the normal operation is resumed after the normal operation has been interrupted and an access has been had to said synchronous storage with a clock different from the system clock, thereby restoring said address data register, said data input register and said data output register in said synchronous storage to the same conditions as before the interruption of the normal operation, said address backup registers, said data backup registers and said switching means being provided on the same memory chip, and a terminal for inputting a signal for instructing a restoring operation by said switching means.

The present invention also provides a synchronous storage having an address data register and a data input register operating in synchronism with a system clock comprising an address backup register for storing at all times the latest one among address information having been transferred to said address data register in synchronous with the system clock during a normal operation, a data backup registers for storing at all times the latest one among write data information having been transferred to said data input register in synchronism with the system clock during the normal operation, a switching means for outputting information stored in said address backup register and said data backup register to said address data register and said data input register in said synchronous storage when the normal operation is resumed after the normal operation has been interrupted and an access has been had to said synchronous storage with a clock different from the system clock, thereby restoring said address data register and said data input register in said synchronous storage to the same conditions as before the interruption of the normal operation, said address backup register, said data backup register and said switching means being provided on the same memory chip, and a terminal for inputting a signal for instructing a restoring operation by said switching means.

According to the information processing apparatus having the synchronous storage and the synchronous storage of this invention, it is possible to restore the registers in the synchronous storage to the same conditions as before an interruption of the normal operation when the normal operation is resumed after the normal operation has been interrupted and an access has been had to the synchronous storage with a clock different from the system clock without hindrance so as to resume continuously the normal operation. This invention therefore may largely improve the operability.

Figure 1:
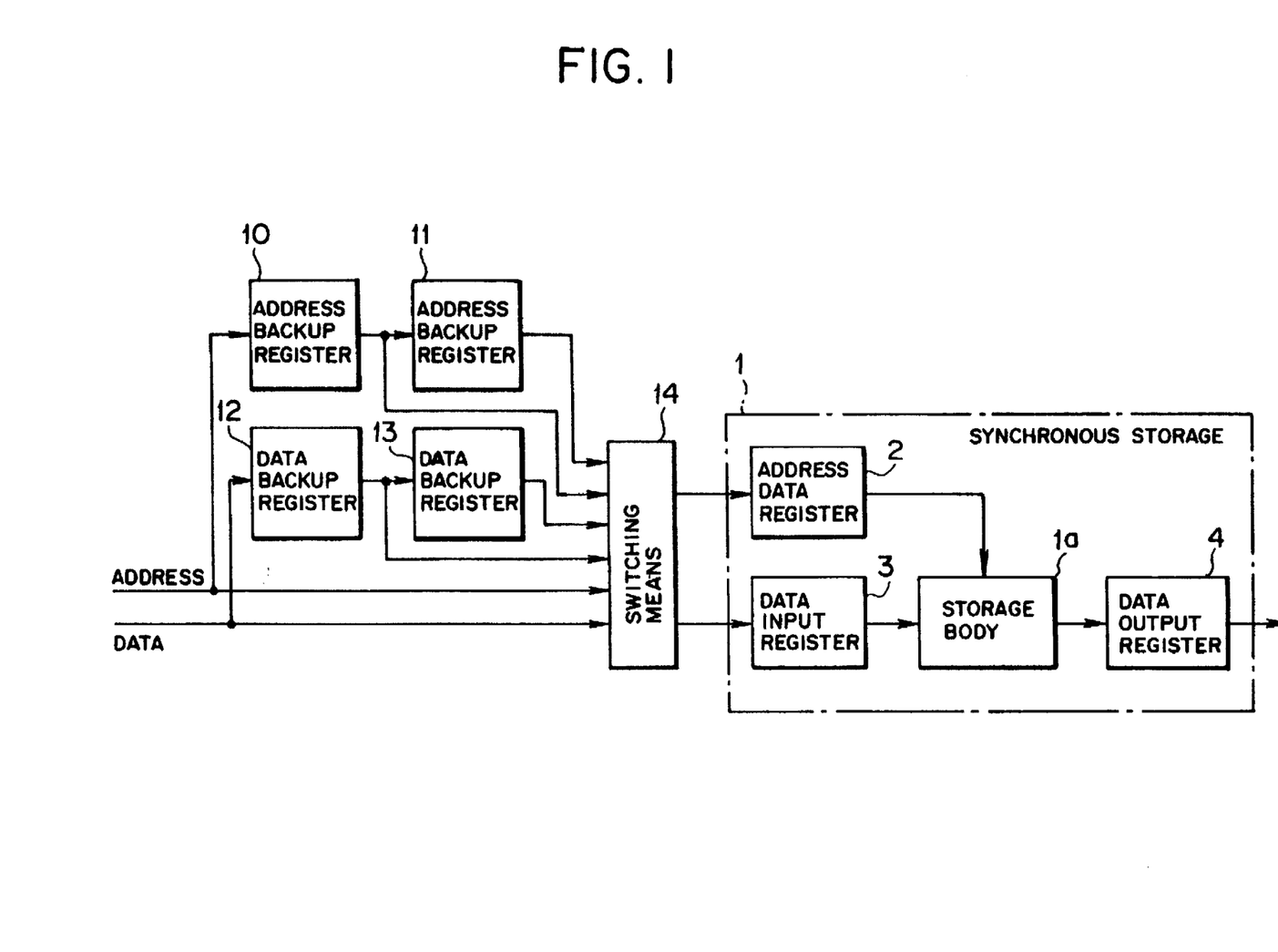
FIGS. 1 and 2 are block diagrams showing aspects of this invention.

DESCRIPTION OF THE PREFERRED EMBODIMENT (a) Description of Aspects of the Invention FIG. 1 is a block diagram showing an aspect of this invention. In FIG. 1, reference numeral 1 denotes a synchronous storage. The synchronous storage 1 is formed on a memory chip with a storage body 1a, an address data register 2, a data inputting register 3, and a data outputting register 4, similar to that having been described in FIGS. 8 through 13.

Reference numerals 10 and 11 denote address backup registers. These address backup registers 10 and 11 successively store, at all times, the latest two addresses among address information having been transferred to the address data register 2 in synchronism with a system clock in the normal operation.

Reference numerals 12 and 13 denote data backup registers. These data backup registers 12 and 13 successively store, at all times, the latest two among written data information having been transferred to the data input register 3 in synchronism with the system clock in the normal operation.

Reference numeral 14 denotes a switching means. The switching means 14 successively selects information stored in the address backup registers 10 and 11 in two stages and the data backup registers 12 and 13 in two stages and outputs the selected information to the address data register 2 and the data input register 3 in the synchronous storage 1 when the normal operation is resumed after an interruption of the normal operation and an access to the synchronous storage 1 with a clock different from the system clock so as to restore the address data register 2, the data input register 3 and the data output register 4 of the synchronous storage 1 to the same conditions as before the interruption of the normal operation.

Figure 2:
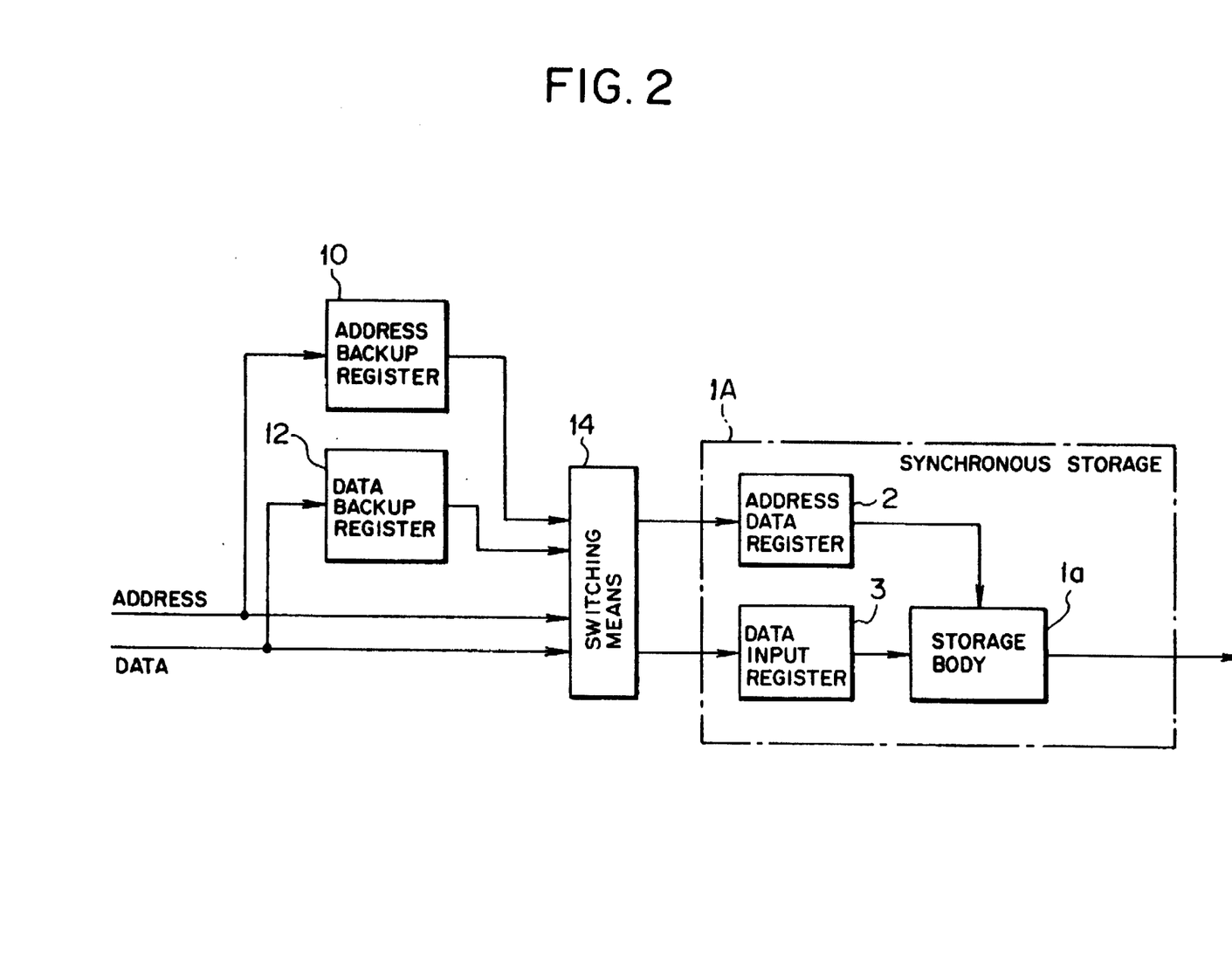

FIG. 2 is a block diagram showing another aspect of this invention. A synchronous storage 1A shown in FIG. 2 is of a type without the data output register 4 provided to the synchronous storage 1 shown in FIG. 1.

When such synchronous storage 1A is employed as shown in FIG. 2, there are provided an address backup register 10 and a data backup register 12, both in one stage. A switching means 14 outputs information stored in the address backup register 10 and the data backup register 12 to an address data register 2 and a data input register 3 of the synchronous storage 1A when the normal operation is resumed after an interruption of the normal operation and an access to the synchronous storage 1A with a clock different from the system clock so as to restore the address data register 2 and the data input register 3 of the synchronous storage 1 to the same conditions as before the interruption of the normal operation.

It is possible to dispose the address backup registers 10 and 11, the data backup registers 12 and 13, and the switching means 14 shown in FIG. 1 on the same memory chip of the synchronous storage 1. Likewise, the address backup register 10, the data backup register 12 and the switching means 14 shown in FIG. 2 may be disposed on the same memory chip of the synchronous storage 1A. In this case, there is additionally provided a terminal used to input a signal for instructing a restoring operation by the switching means 14.

In an information processing apparatus having the synchronous storage of this invention having been described with reference to FIG. 1, in the normal operation, the latest two addresses in the address information having been transferred to the address data register 2 are stored at all times in the address backup registers 10 and 11, and the latest two among the write data information having been transferred to the data input register 3 are stored at all times in the data backup registers 12 and 13.

When the normal operation is resumed after the normal operation has been interrupted and an access (a scanning operation or the like) has been had to the synchronous storage 1 with a clock different from the system clock, the switching means 14 successively selects information stored in the address backup registers 10 and 11, and the data backup registers 12 and 13 both in two stages and outputs the selected information to the address data register 2 and the data input register 3 of the synchronous storage 1.

Whereby, it is possible to restore the address data register 2, the data input register 3 and the data output register 4 in the synchronous storage 1 to the same conditions as before the interruption of the normal operation and continuously resume the normal operation without hindrance.

In the information processing apparatus having the synchronous storage of this invention having been described with reference to FIG. 2, the latest one among the address information having been transferred to the address data register 2 is stored at all times in the address backup register 10, and the latest one among the written data information having been transferred to the data input register 3 is stored at all times in the data backup register 12 during the normal operation.

When the normal operation is resumed after the normal operation has been interrupted and an access (the scanning operation or the like) has been had to the synchronous storage 1 with a clock different from the system clock, the switching means 14 outputs information stored in the address backup register 10 and the data backup register 12 to the address data register 2 and the data input register 3 of the synchronous storage 1.

Whereby, it is possible to restore the address data register 2 and the data input register 3 of the synchronous storage 1 to the same conditions as before the interruption of the normal operation and continuously resume the normal operation without hindrance.

If the address backup registers 10 and 11, the data backup registers 12 and 13, and the switching means 14 are disposed on the same memory chip of the synchronous storage 1 or 1A, it is sufficient to give a signal instructing a restoring operation performed by the switching means 14 to a terminal so as to restore the synchronous storage 1 or 1A as stated above.

According to the information processing apparatus having the synchronous storage 1 or 1A of this invention or the synchronous storage 1 or 1A, the registers 2 through 4 in the synchronous storage 1 or 1A may be restored to the same conditions as before an interruption of the normal operation when the normal operation is resumed after the normal operation has been interrupted and an access has been had to the synchronous storage 1 or 1A with a clock different from the system clock, and the normal operation may be continuously resumed without hindrance. This invention therefore may largely improve the operability.

(b) Description of First Embodiment

Figure 3:
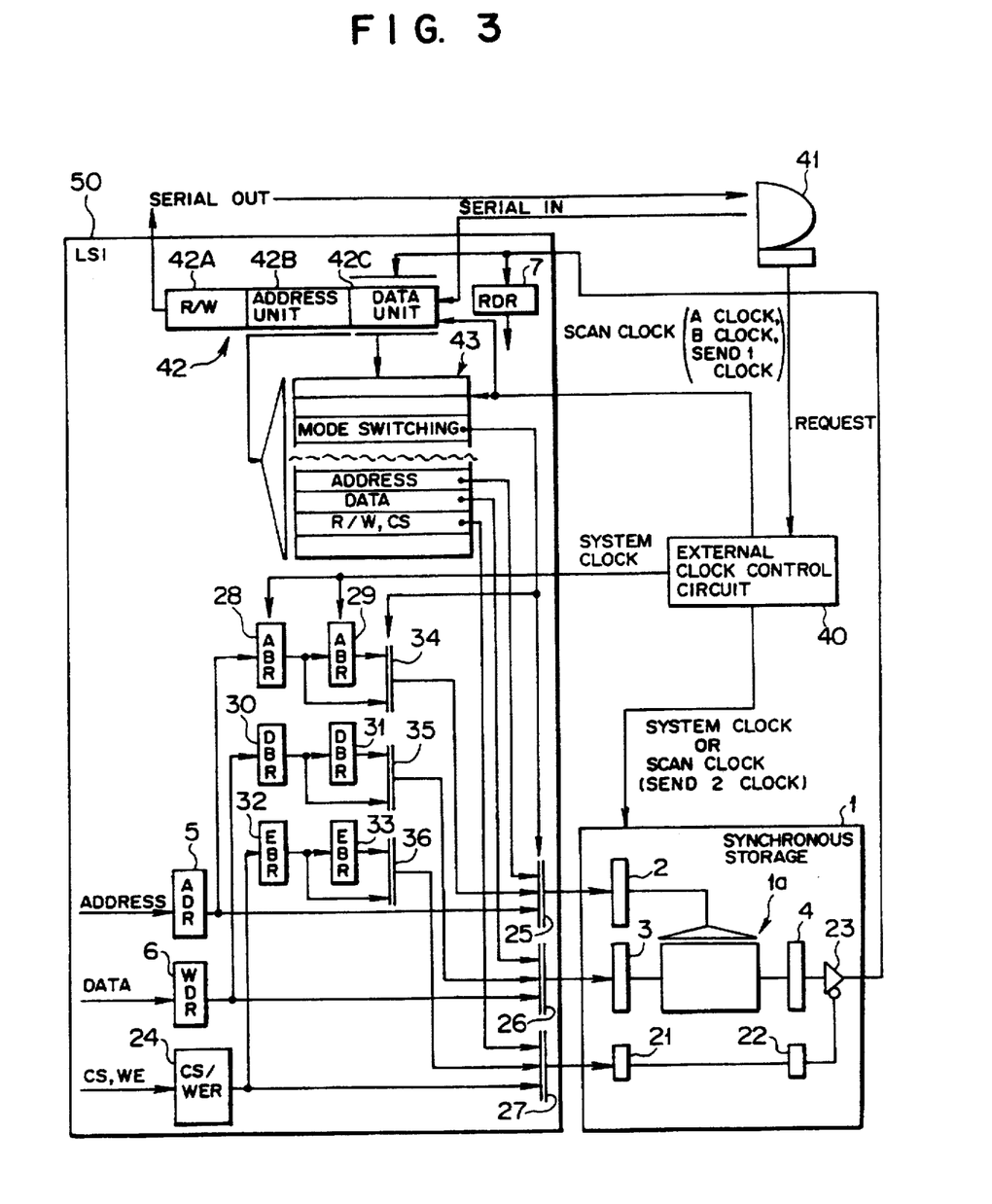
FIG. 3 is a block diagram showing a structure of an information processing apparatus having a synchronous storage according to a first embodiment of this invention.

FIG. 3 is a block diagram showing a structure of an information processing apparatus having a synchronous storage as a first embodiment of this invention. In FIG. 3, reference numeral 1 denotes a synchronous storage having substantially the same structure as the synchronous storages having been described with reference to FIGS. 1 and 8, respectively. According to this embodiment, the synchronous storage 1 has a storage body 1a, an address data register (ADR) 2, a data input register 3, a data output register 4, enable data registers (EDRs) 21 and 22, and a gate 23, formed on a memory chip.

The storage body 1a and the registers 2 through 4 are similar to those having been described hereinbefore, descriptions of which are thus omitted here.

The enable data registers 21 and 22 retain a chip select signal CS and a write enable signal WE (data for two bits) inputted from the outside. The enable registers 21 and 22 are connected in series to each other in continuous two stages to perform a retaining operation of data according to a clock (a system clock or a scan clock) inputted from the outside.

The gate 23 operates according to a write enable signal WE retained in the enable data register 22. When the write enable signal WE is in an ON state (a high level), the gate 23 is in a high impedance state to cause the synchronous storage 1 to be in a writable state. When the write enable signal WE is in an OFF state (a low level), the gate 23 is in an open state to cause the synchronous storage 1 to be in a readable state.

According to this embodiment, the synchronous storage 1 as stated above is provided in an LSI 50 forming an information processing apparatus such as a computer system to be used as a part of the information processing apparatus. The LSI 50 has a scan circuit (described later) being capable of reading and writing internal state values (values of each of the registers 2 through 4, 21 and 22) in the synchronous storage 1 in addition to a main circuit (not shown) operating during the operation.

The LSI 50 further includes a chip select/write enable register (CS/WER) 24, multiplexers 25 through 27 and 34 through 36, backup registers 28 through 33, an idle register 42 and a scan table 43 in addition to the address data register (ADR) 5, the write data register (WDR) 6 and the read data register (RDR) 7, which have been described hereinbefore.

The address data register 5, the write data register 6 and the read data register 7 are similar to those having been described hereinbefore, no description of which is thus made here.

The chip select/write enable register 24 retains a chip select signal CS and a write enable signal WE (data for two bits) for the synchronous storage 1 according to the system clock.

The multiplexers (switching means) 25 through 27 each performs a switching operation according to mode switching information of the scan table 43 depending on the time of normal operation, the time of scanning operation or the time of data restoration.

The multiplexer 25 performs a switching operation so as to select address data from the address data register 5 at the time of the normal operation, select address data from the scan table 43 at the time of the scanning operation or select address data from the multiplexer 34 at the time of data restoration, and outputs selected address data to the address data register 2 of the synchronous storage 1.

The multiplexer 26 performs a switching operation so as to select write data from the write data register 6 at the time of the normal operation, select write data from the scan table 43 at the time of the scanning operation or select write data from the multiplexer 35 at the time of the data restoration, and outputs selected write data to the data input register 3 of the synchronous storage 1.

The multiplexer 27 performs a switching operation so as to select enable data (including chip select information) from the chip select/write enable register 24 at the time of the normal operation, select R/W, CS data from the scan table 43 at the time of the scanning operation, or select enable data from the multiplexer 36 at the time of data restoration, and outputs selected data to the enable data register 21 of the synchronous storage 1.

Meanwhile, the address backup registers 28 and 29 successively store the latest two among address data having been transferred from the address data register 5 to the address data register 2 in synchronism with the system clock during the normal operation to backup at all times. Data having been transferred two times before is set up in the address backup register 29, while data transferred the last time is set up in the address backup register 28.

The data backup registers 30 and 31 store the latest two among write data information having been transferred from the write data register 6 to the data input register 3 in synchronism with the system clock during the normal operation to backup at all times. Data having been transferred two times before is set up in the address backup register 31, while data having been transferred the last time is set up in the address backup register 30.

The enable backup registers 32 and 33 store the latest two among information having been transferred from the chip select/write enable register 24 to the enable data register 21 in synchronism with the system clock during the normal operation to back up at all times. Data having been transferred two times before is set up in the enable backup register 33, while data having been transferred the last time is set up in the enable backup register 32.

With the backup data set up in these backup registers 28 through 33, the data restoration is carried out in the synchronous storage 1 as described later.

The multiplexers (the switching means) 34 through 36 each performs a switching operation according to mode switching information of the scan table 43 upon data restoration. The multiplexer 34 performs a switching operation upon data restoration so as to select and output address data from the address backup register 29, after that, select and output address data from the address backup register 28.

Likewise, the multiplexer 35 performs a switching operation upon data restoration so as to select and output write data from the data backup register 31, after that, select and output write data from the data backup register 30. The multiplexer 36 performs a switching operation upon data restoration so as to select and output information from the enable backup register 33, after that, select and output information from the enable backup register 32.

According to this embodiment, the idle register 42 and the scan table (a sense table) 43 configure a scan circuit on the LSI 50.

The idle register 42 temporarily retains various data for scanning serially transferred from an external operation apparatus 41 upon the scanning operation before the various data is stored in the scan table 43, while temporarily retaining data such as a result of the scanning fed from the synchronous storage 1, which should be serially transferred to the external operation apparatus 41.

The idle register 42 serially stores or outputs information for, for example, eight bits according to a scan clock (A clock, B clock). The idle register 42 has a R/W specifying unit 42A for, for example, one bit for specifying a read/write to the scan table 43, an addressing unit 42B for, for example, three bits for specifying an address on the scan table 43, and a data unit 42C for, for example, four bits for retaining data that should be stored in the scan table 43.

If a write is specified to the R/W specifying unit 42A of the idle register 42, the data in the data unit 42C is transferred from the idle register 42 to an address on the scan table 43 specified by the addressing unit 42B according to the scan clock (a SEND 1 clock) and stored therein.

The content of the data unit 42C transferred to the scan table 43 includes data of the mode switching information used to control switching conditions of the multiplexers 25 through 27 and 34 through 36 in the LSI 50, read/write specifying information to the synchronous storage 1 or the like and the chip select information in addition to an address and data that should be written in the synchronous storage 1 or the like.

The scan table 43 receives various data for scanning transferred according to the SEND 1 clock, which have been transferred from the external operation apparatus 41 and temporarily stored in the idle register 42 as stated above, and retains and stores them therein. On the basis of the various data retained in the scan table 43, it is possible to alter settings of the internal conditions of the LSI 50 and the synchronous storage 1 upon the scanning operation.

Meanwhile, a system having a scanning function requires two sorts of clocks. More specifically, the system clock is used at the time of the normal operation, while the scan clock is used at the time of the scanning operation. The external clock control circuit 40 generates the two sorts of clocks, switches the clock according to a request from the external operation apparatus 41, and suitably supplies the system clock or the scan clock to parts requiring it.

The system clock required at the time of the normal operation is supplied from the external clock control circuit 40 to the registers 5 through 7, 24, and 28 through 33 on the LSI 50 and the registers 2 through 4, 21 and 22 on the synchronous storage 1.

On the other hand, the scan clock required at the time of the scanning operation is generated in response to a request from the external operation apparatus 41, and supplied from the external clock control circuit 40 to the idle register 42 and the scan table 43 on the LSI 50, and the registers 2 through 4, 21 and 22 on the synchronous storage 1. In the registers 5 through 7, 24, and 28 through 33 on the LSI 50 not supplied the scan clock, the contents (register values) when a supply of the system clock is stopped are retained and fixed as they are.

The scan clock supplied to the idle register 42 and the scan table 43 is an A clock and a B clock for serial transfer and the SEND 1 clock used to transfer data from the idle register 42 to the scan table 43. On the other hand, the scan clock supplied to the synchronous storage 1 instead of the system clock is a SEND 2 clock used to operate the registers 2 through 4, 21 and 22.

The external operation apparatus 41 is used by an operator to input a request for the scanning operation or the like. The external operation apparatus 41 has a function to automatically send various data or a request to the idle register 42 or the external clock control circuit 40 when receiving a request for the scanning operation. Incidentally, various data or a request for the scanning operation may be manually inputted by an operator from the external operation apparatus 41. The scan clock (the SEND 2 clock for the synchronous storage 1, in particular) may not be generated by the external clock control circuit 40 but manually inputted by the operator (a manual clock) from the external operation apparatus 41.

An operation of the apparatus according to this embodiment having the above structure will be described with reference to a timing chart shown in FIG. 4.

For instance, when a read access is performed on the synchronous storage 1 during the normal operation, the system clock from the external clock control circuit 40 is supplied to the registers 5 through 7, 24, and 28 through 33 on the LSI 50 and the registers 2 through 4, 21 and 22 on the synchronous storage 1. According to a rise of the system clock, each of the registers 5 through 7, 24, 28 through 33, 2 through 4, 21 and 22 operates as below. It is noted that operations of only the registers 5, 28, 29 and 2 and the data output register 4 in relation to address data will be illustrated and explained in the following description, but another registers operate similarly.

At the time of the normal operation, the multiplexers 25 through 27 are switched to the side of the registers 5, 6 and 24. If addresses A0, A1, A2, A3 and A4 are successively transferred to the address data register 5 as shown in FIG. 4, the first address A0 is transferred to the address backup register 28 and the address data register 2 of the synchronous storage 1 according to a rise of the next system clock.

According to a rise of the third system clock, the address A0 retained in the address backup register 28 is transferred to the address backup register 29 in the next stage, and the data a0 at the address A0 retained in the address data register 2 is read out and transferred from the storage body 1a and stored in the data output register 4, at the same time. Read data stored in the data output register 4 is transferred to the read data register 7 according to a rise of the fourth system clock.

The normal operation is performed by repeating the above operation. If the system clock is stopped when the address A4 is transferred to the address data register 5 to interrupt the normal operation, for example, the address A3 having been transferred to the synchronous storage 1 the last time is retained in the address backup register 28, besides the address A2 having been transferred to the synchronous storage 1 two times before is retained in the address backup register 29.

When the apparatus gets into the scanning operation (a scan read) from the above condition, the multiplexers 25 through 27 are all switched to the side of the scan table 43, and a request is outputted from the external operation apparatus 41 to the external clock control circuit 40 to generate the scan clock instead of the system clock, at the same time. The scan clock is not supplied to the registers 5 through 7, 24 and 28 through 33 on the LSI 50, so these registers fixedly retain the contents at the time that the normal operation was stopped.

If the scan addresses A0, A1 and X0 are successively transferred from the scan table 43 to the address data register 2 of the synchronous storage 1 according to a rise of the system clock (the SEND 2 clock) fed from the external clock control circuit 40, data a0, a1 and x0 at the respective addresses A0, A1 and X0 retained in the address data register 2 are successively read out from the storage body 1a to the data output register 4 according to a rise of the next scan clock and transferred as scan read data from the synchronous storage 1 to the idle register 42. Meanwhile, a scan write operation is carried out in a similar manner to the above scan read operation by transferring the data in the scan table 43 to the multiplexer 26 and the data input register 3.

According to this embodiment, the scan clocks (the SEND 2 clock) for two pulses are generated, and the multiplexers 25 through 27 and 34 through 36 are controllably switched as below on the basis of mode switching information of the scan table 43 after the above scanning operation so that the internal conditions of the registers 2 through 4, 21 and 22 in the synchronous storage 1 are restored to a state at the time that the normal operation was stopped.

Specifically, the multiplexers 25 through 27 are switched to the side of the multiplexers 34 through 36, respectively. After that, the multiplexers 34 through 36 are switched to the side of the backup registers 29, 31 and 33, respectively, to transfer the data transferred two times before retained in each of the backup registers 29, 31 and 33 to the registers 2, 3 and 21 of the synchronous storage 1, respectively, according to a rise of the first scan clock for data restoration.

After that, the multiplexers 34 through 36 are switched to the side of the backup registers 28, 30 and 32, respectively, and the data having been transferred the last time retained in the backup registers 28, 30 and 32 are transferred to the registers 2, 3 and 21 of the synchronous storage 1, respectively, according to a rise of the second scan clock for data restoration.

Figure 4:
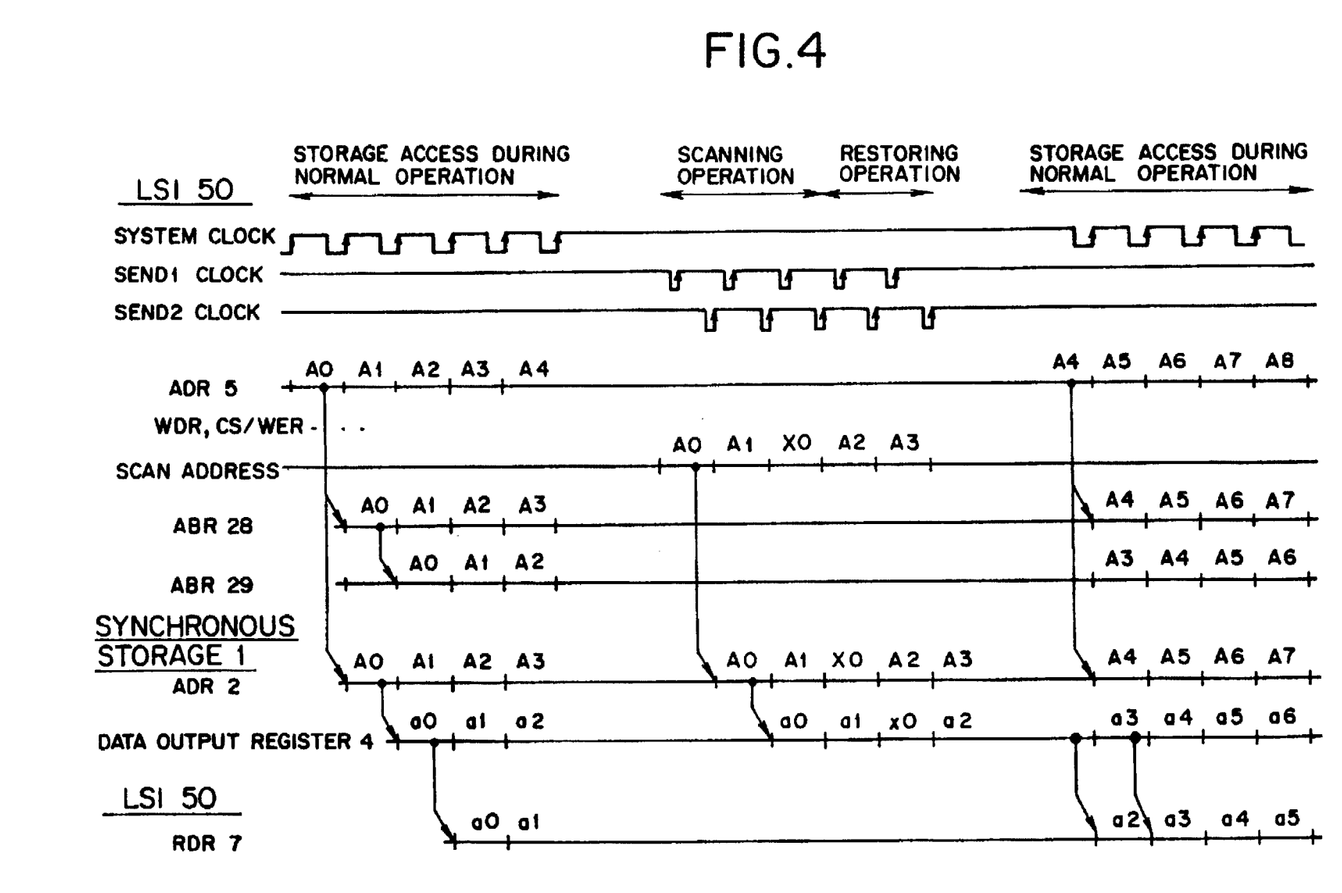
FIG. 4 is a timing chart for illustrating an operation of the first embodiment.

In the example shown in FIG. 4, the address A3 and the read data a2 at the time that the normal operation was stopped are retained in the address data register 2 and the data output register 4 in the synchronous storage 1, respectively. This means that the data restoration has been completed.

After the data restoration has been completed, the multiplexers 25 through 27 are again switched to the side of the registers 5, 6 and 24, respectively, and the clock generated by the external clock control circuit 40 is switched to the system clock to resume the normal operation.

According to the first embodiment of this invention, the latest two among the addresses, data, and enable information transferred to the synchronous storage 1 are stored in the address backup registers 28 through 33, respectively, at all times during the normal operation so that the internal conditions of the respective registers 2 through 4, 21 and 22 of the synchronous storage 1 may be restored to the same conditions as before an interruption of the normal operation when the normal operation is resumed after the normal operation has been interrupted and the scan operation or the like has been performed on the synchronous storage 1 with the scan clock different from the system clock by switching controls over the multiplexers 25 through 27 and 34 through 36.

It is therefore possible to interrupt the normal operation and resume the operation continuing from before the interruption after the scanning operation without hindrance. This may contribute to an improvement of the operability of an information processing apparatus employing the synchronous storage 1.

(c) Description of Second Embodiment

Figure 5:
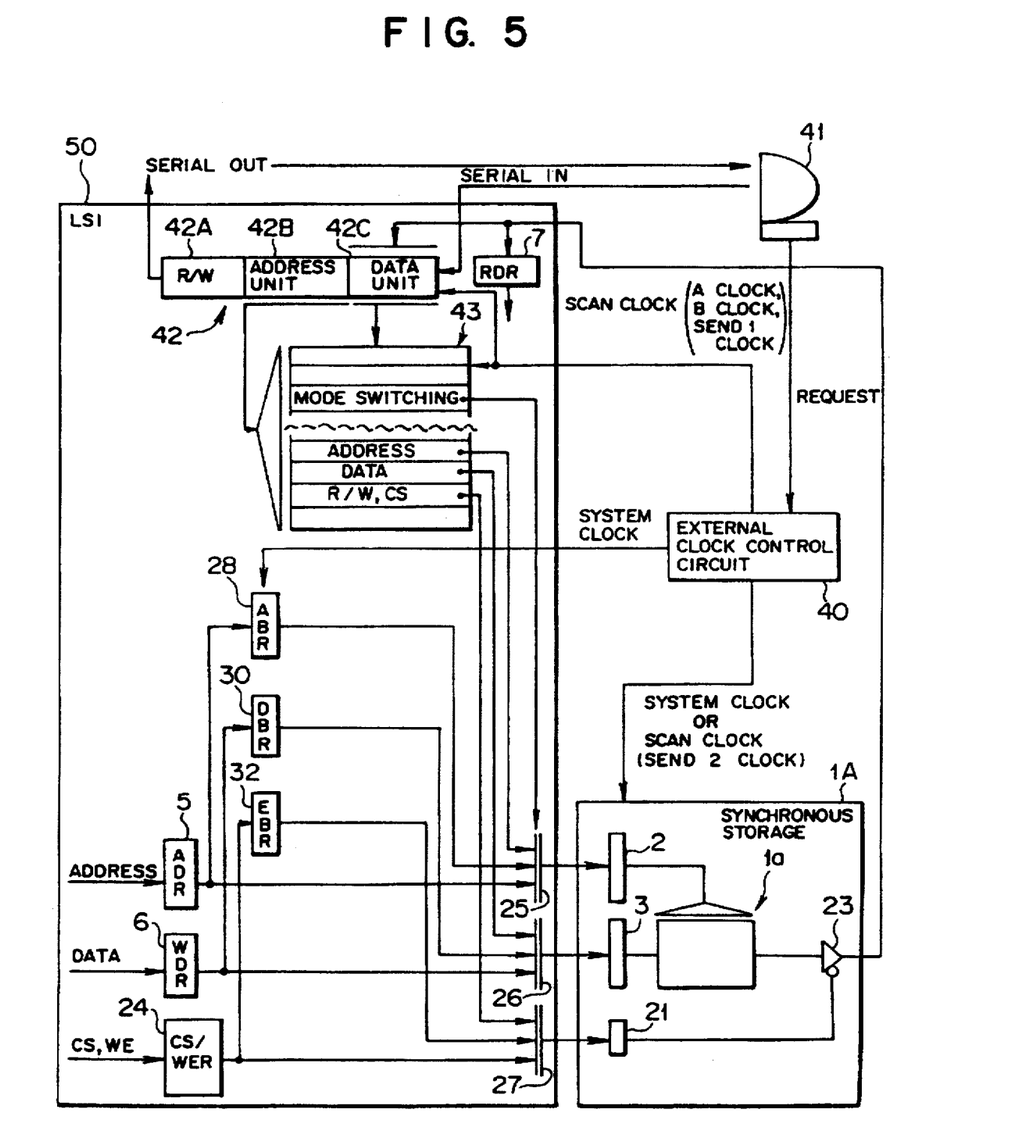
FIG. 5 is a block diagram showing a structure of an information processing apparatus having a synchronous storage according to a second embodiment of this invention.

FIG. 5 is a block diagram showing a structure of an information processing apparatus having a synchronous storage as a second embodiment of this invention. In the second embodiment shown in FIG. 5, a synchronous storage 1A of a type without the data output register 4 and the enable data register 22 is employed instead of the synchronous storage 1 of the first embodiment.

The apparatus according to the second embodiment has a structure similar to that of the first embodiment. However, the backup registers 29, 31 and 33 and the multiplexers 34 through 36 are omitted in the apparatus of the second embodiment, as shown in FIG. 5. As this, the structure of the apparatus of the second embodiment is largely simplified.

Figure 6:
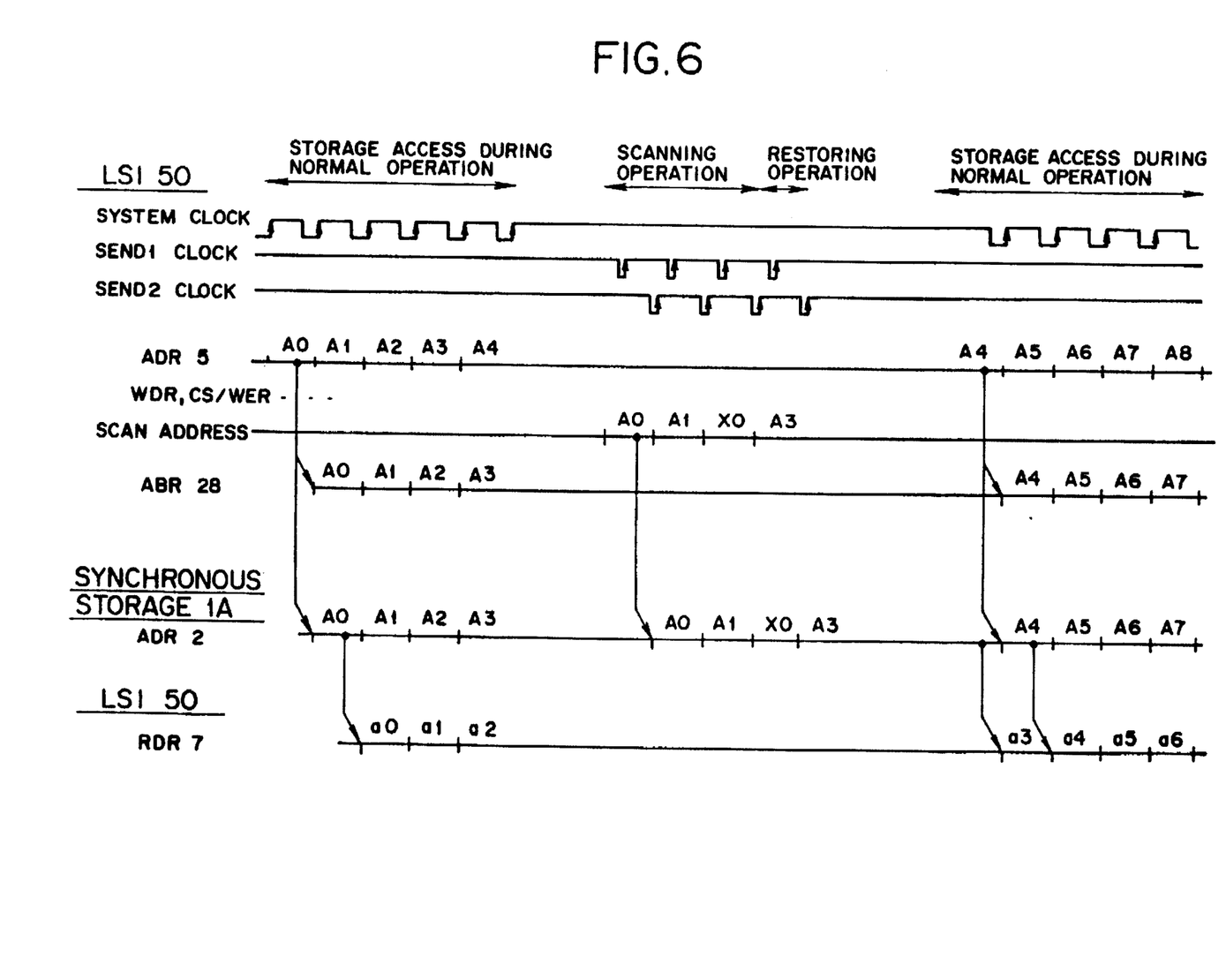
FIG. 6 is a timing chart for illustrating an operation of the second embodiment.

An operation of the apparatus according to the second embodiment will be next described referring to a timing chart shown in FIG. 6. According to this embodiment, after the scanning operation (a scan read) similar to that in the first embodiment shown in FIG. 4, the scan clock (the SEND 2 clock) for one pulse is generated and the multiplexers 25 through 27 are switched to the side of the backup registers 28, 30 and 32, respectively, on the basis of the mode switching information of the scan table 43, whereby the internal conditions of the registers 2, 3 and 21 in the synchronous storage 1A are restored to conditions at the time of an interruption of the normal operation.

More specifically, the multiplexers 25 through 27 are switched to the side of the backup registers 28, 30 and 32, respectively, to transfer data having been transferred the last time and retained in the backup registers 28, 30 and 32 to the registers 2, 3 and 21 of the synchronous storage 1A, respectively, according to a rise of the scan clock for data restoration.

Whereby, the address A3 at the time of interruption of the normal operation is retained in the address register 2 in the synchronous storage 1A so that the data restoration is completed in the example shown in FIG. 6.

After the data restoration as above, the multiplexers 25 through 27 are again switched to the side of the registers 5, 6 and 24, respectively, and a clock generated by the external clock control circuit 40 is switched to the system clock to resume the normal operation.

According to the second embodiment of this invention, the latest ones among the addresses, data, enable information having been transferred to the synchronous storage 1A are stored in the address backup registers 28, 30 and 32, respectively, at all times during the normal operation, as above. In consequence, when the normal operation is resumed after the normal operation has been interrupted and the scanning operation or the like has been performed on the synchronous storage 1A with the scan clock different from the system clock, the multiplexers 25 through 27 are controllably switched so that the internal conditions of the respective registers 2, 3 and 21 of the synchronous storage 1A may be restored to the same conditions as before the interruption of the normal operation.

It is therefore possible to interrupt the operation and resume an operation continuing from before the interruption of the scanning operation without hindrance, as same as the first embodiment. This may largely contribute to an improvement in the operability of an information processing apparatus employing the synchronous storage 1.

(d) Description of Third Embodiment

Figure 7:
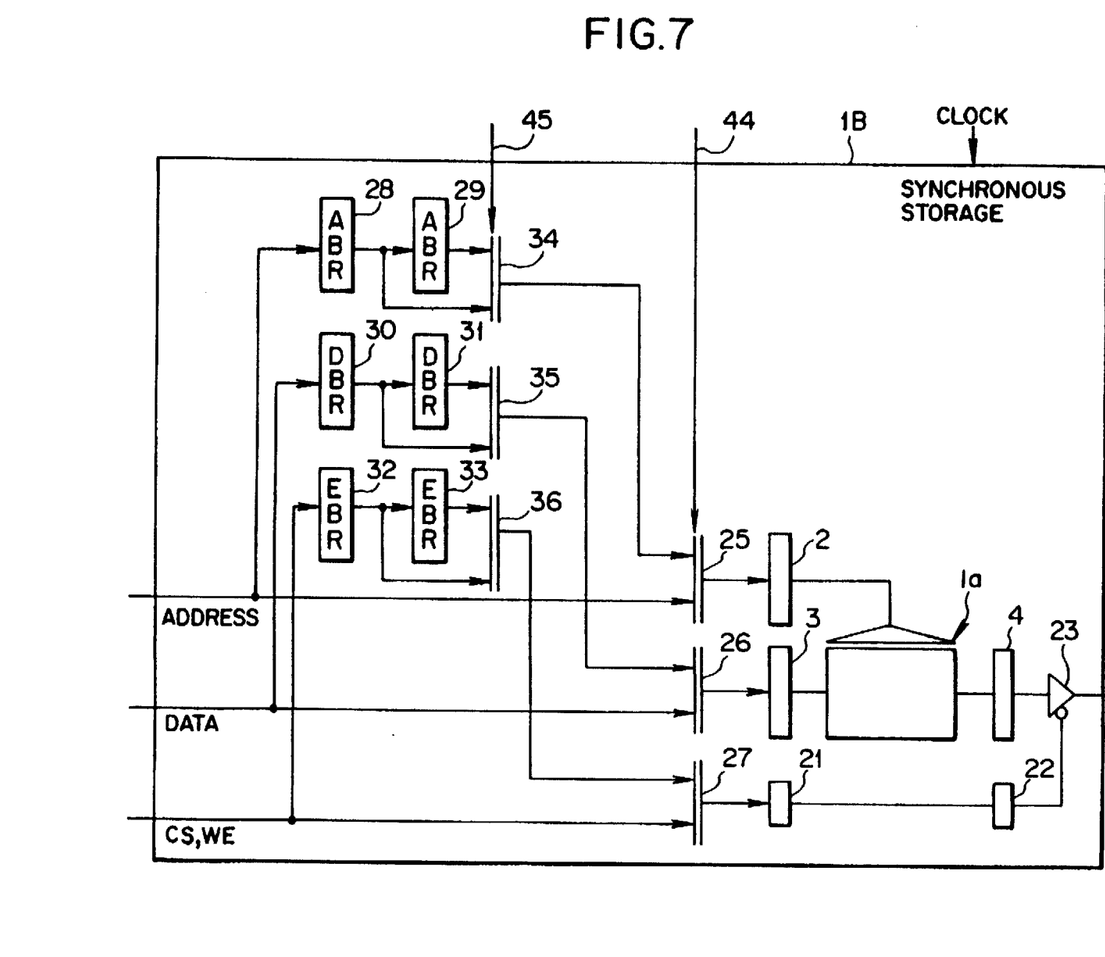
FIG. 7 is a block diagram showing a structure of a synchronous storage according to a third embodiment of this invention.

FIG. 7 is a block diagram showing a structure of a synchronous storage as a third embodiment of this invention. According to the third embodiment, the multiplexers 25 through 27 and 34 through 36 and the backup registers 28 through 33 having been described with reference to FIG. 3 are provided on the same memory chip as that of the synchronous storage 1B, as shown in FIG. 7. Incidentally, the synchronous storage 1B has a storage body 1a, registers 2 through 4, 21 and 22 and a gate 23 similarly to the synchronous storage 1 of the first embodiment.

The synchronous storage 1B as above includes a mode switching signal input terminal 44 for supplying a signal based on the mode switching information of the scan table 43 to the multiplexers 25 through 27 in order to control switching conditions of the respective multiplexers 25 through 27, and a mode switching signal input terminal 45 for supplying a signal based on the mode switching information of the scan table 43 to the multiplexers 34 through 36 in order to control switching conditions of the respective multiplexers 34 through 36.

The synchronous storage 1B is connected to the registers 5 through 7 and 24, and the scan table 43 explained in the first embodiment so as to be substantially used in the quite same manner as the apparatus shown in FIG. 3 and function as same as the synchronous storage 1 of the first embodiment. The operation of the synchronous storage 1B in the above case is the same as having been described with reference to the timing chart shown in FIG. 4. This third embodiment may give the same effect as the apparatus of the first embodiment.

It is possible to restore the data in the manual operation in the synchronous storage 1B by providing a structure necessary for the data restoration to the synchronous storage 1B of the third embodiment. Namely, after the scanning operation with a manual clock or the like, a mode switching signal is manually supplied to the mode switching signal input terminals 44 and 45 to restore the data at a desirable timing according to an intention of the operator.

(e) Others

It is possible to provide the multiplexers 25 through 27 and the backup registers 28, 30 and 32 constituting the apparatus of the second embodiment having been described with reference to FIG. 5 on the same memory chip as that of the synchronous storage 1A. In this case, the data output register 4 and the enable data register 22 shown in FIG. 7 are omitted, besides the backup registers 29, 31 and 33, the multiplexers 34 through 36 and the mode switching signal input terminal 45 are omitted.

The synchronous storage as above is connected to the registers 5 through 7 and 24, and the scan table 43 to be used substantially in the same manner as the apparatus shown in FIG. 5 so as to function as same as the synchronous storage 1A according to the second embodiment. The apparatus in this case operates as having been described with reference to the timing chart shown in FIG. 6. This synchronous storage may give the same effect as the apparatus according to the first embodiment.

What is claimed is:

1. An information processing apparatus having a synchronous storage having an address data register, a data input register and a data output register operating in synchronism with a system clock, comprising:

address backup registers in two stages for storing at all times the latest two among address information having been transferred to said address data register in synchronism with the system clock during a normal operation;

data backup registers in two stages for storing at all times the latest two among write data information having been transferred to said data input register in synchronism with the system clock during the normal operation; and switching means for successively selecting information stored in said address backup registers in two stages and said data backup registers in two stages to output the selected information to said address data register and said data input register in said synchronous storage when the normal operation is resumed after the normal operation has been interrupted and an access has been had to said synchronous storage with a clock different from the system clock, thereby restoring said address data register, said data input register and said data output register in said synchronous storage to the same conditions as before the interruption of the normal operation.

2. An information processing apparatus having a synchronous storage having an address data register and a data input register operating in synchronism with a system clock, comprising:

an address backup register for storing at all times the latest one among address information having been transferred to said address data register in synchronism with the system clock during a normal operation;

a data backup register for storing at all times the latest one among write data information having been transferred to said data input register in synchronism with the system clock during the normal operation; and switching means for outputting information stored in said address backup register and said data backup register to said address data register and said data input register in said synchronous storage when the normal operation is resumed after the normal operation has been interrupted and an access has been had to said synchronous storage with a clock different from the system clock, thereby restoring said address data register and said data input register in said synchronous storage to the same conditions as before the interruption of the normal operation.

3. A synchronous storage having an address data register, a data input register and a data output register operating in synchronism with a system clock comprising:

address backup registers in two stages for storing at all times the latest two among address information having been transferred to said address data register in synchronism with the system clock during a normal operation;

data backup registers in two stages for storing at all times the latest two among write data information having been transferred to said data input register in synchronism with the system clock during the normal operation;

switching means for successively selecting information stored in said address backup registers in two stages and said data backup registers in two stages to output the selected information to said address data register and said data input register in said synchronous storage when the normal operation is resumed after the normal operation has been interrupted and an access has been had to said synchronous storage with a clock different from the system clock, thereby restoring said address data register, said data input register and said data output register in said synchronous storage to the same conditions as before the interruption of the normal operation, said address backup registers, said data backup registers and said switching means being provided on the same memory chip; and a terminal for inputting a signal for instructing a restoring operation by said switching means.

4. A synchronous storage having an address data register and a data input register operating in synchronism with a system clock comprising:

an address backup register for storing at all times the latest one among address information having been transferred to said address data register in synchronism with the system clock during a normal operation;

a data backup registers for storing at all times the latest one among write data information having been transferred to said data input register in synchronism with the system clock during the normal operation;

switching means for outputting information stored in said address backup register and said data backup register to said address data register and said data input register in said synchronous storage when the normal operation is resumed after the normal operation has been interrupted and an access has been had to said synchronous storage with a clock different from the system clock, thereby restoring said address data register and said data input register in said synchronous storage to the same conditions as before the interruption of the normal operation, said address backup register, said data backup register and said switching means being provided on the same memory chip; and a terminal for inputting a signal for instructing a restoring operation by said switching means.

* * * * *